US010206030B2

(12) United States Patent
Matsumoto et al.

(10) Patent No.: US 10,206,030 B2
(45) Date of Patent: Feb. 12, 2019

(54) MICROPHONE ARRAY SYSTEM AND MICROPHONE ARRAY CONTROL METHOD

(71) Applicant: PANASONIC INTELLECTUAL PROPERTY MANAGEMENT CO., LTD., Osaka (JP)

(72) Inventors: Hiroyuki Matsumoto, Fukuoka (JP); Shuichi Watanabe, Fukuoka (JP); Hisashi Tsuji, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 295 days.

(21) Appl. No.: 15/001,634

(22) Filed: Jan. 20, 2016

(65) Prior Publication Data
US 2016/0234593 A1    Aug. 11, 2016

(30) Foreign Application Priority Data

Feb. 6, 2015 (JP) .................................. 2015-022423

(51) Int. Cl.
H04N 5/232    (2006.01)
G01S 5/20    (2006.01)
(Continued)

(52) U.S. Cl.
CPC ................ *H04R 1/406* (2013.01); *G01S 5/20* (2013.01); *H04N 5/23293* (2013.01);
(Continued)

(58) Field of Classification Search
CPC ...... H04R 1/406; H04R 3/005; H04R 29/008; H04R 2201/401; H04R 2430/20; G01S 5/20; H04N 5/23293
(Continued)

(56) References Cited

U.S. PATENT DOCUMENTS

2001/0024233 A1*  9/2001  Urisaka .................. H04N 5/232
                                          348/211.6
2005/0140810 A1*  6/2005  Ozawa ............... H04N 5/23293
                                          348/333.02
(Continued)

FOREIGN PATENT DOCUMENTS

JP    2004-080121       3/2004
JP    2012-129873 A     7/2012
(Continued)

*Primary Examiner* — Marnie A Matt
(74) *Attorney, Agent, or Firm* — Greenblum & Bernstein, P.L.C.

(57) ABSTRACT

A microphone array system includes a camera that images a picture for a target place, and a microphone array that picks up sound. A sound source position is calculated based on the picked up sound. An image is displayed on a display, the image including an imaged target place picture and a sound source position mark indicative of the sound source position. An instruction of a specified spot is received in the target place picture displayed on the display. Sound directivity is formed in a direction from the microphone array toward the specified spot based on the picked up sound, and sound data is generated by emphasizing sound in the direction in which the sound directivity is formed. The generated sound data is output to the speaker to reproduce the sound data.

7 Claims, 9 Drawing Sheets

(51) Int. Cl.
 *H04R 1/40* (2006.01)
 *H04R 3/00* (2006.01)
 *H04R 29/00* (2006.01)

(52) U.S. Cl.
 CPC ............ *H04R 3/005* (2013.01); *H04R 29/008* (2013.01); *H04R 2201/401* (2013.01); *H04R 2430/20* (2013.01)

(58) Field of Classification Search
 USPC ........................................................ 348/143
 See application file for complete search history.

(56) References Cited

U.S. PATENT DOCUMENTS

| | | | |
|---|---|---|---|
| 2010/0254543 A1* | 10/2010 | Kjolerbakken | H04R 1/406 381/92 |
| 2012/0162259 A1* | 6/2012 | Sakai | G01S 3/8083 345/634 |
| 2012/0163610 A1* | 6/2012 | Sakagami | H04R 3/005 381/56 |
| 2014/0154968 A1 | 6/2014 | Root et al. | |
| 2014/0376740 A1* | 12/2014 | Shigenaga | G06F 21/60 381/92 |
| 2015/0147048 A1* | 5/2015 | Kim | H04N 21/4852 386/282 |

FOREIGN PATENT DOCUMENTS

| | | |
|---|---|---|
| JP | 2012-133250 A | 7/2012 |
| JP | 2012-147420 A | 8/2012 |
| JP | 2014-110640 | 6/2014 |

\* cited by examiner

MICROPHONE ARRAY SYSTEM AND MICROPHONE ARRAY CONTROL METHOD

BACKGROUND OF THE INVENTION

1. Field of the Invention

The present disclosure relates to a microphone array system and a microphone array control method which picks up sound from a desired sound source in a target area.

2. Description of the Related Art

For example, in a large venue, such as the venue for the lecture or an auditorium, where a lecture or a course is given to a large audience, the voice of a lecturer or an instructor is amplified such that the voice widely reaches within the venue. However, when the lecturer or the instructor receives a question from one of the audience members, it is necessary to amplify voice emitted by the audience member in the same manner. In such a case, the sound of the voice emitted by the audience member is picked up and reproduced by a microphone such that the lecturer or the instructor easily listens to the question of the audience member, or other audience members in the venue can monitor the content of the question between the lecturer and the audience member.

In order to pick up the sound of voice from a questioner in an arbitrary position in the large venue, methods are used of arranging a plurality of microphones throughout the entire venue, picking up sound by switching to a microphone close to the questioner, picking up sound by moving the microphone to the questioner, and the like. For example, Japanese Patent Unexamined Publication No. 2004-080121 and Japanese Patent Unexamined Publication No. 2014-110640 disclose microphone array systems which can be used for such a purpose. Japanese Patent Unexamined Publication No. 2004-080121 discloses an infrared ray receiver that includes a plurality of infrared-type microphones, switches and receives infrared signals from the microphones, and is capable of picking up sound in a plurality of positions. Japanese Patent Unexamined Publication No. 2014-110640 discloses an audio system that includes wireless microphones associated with an antenna array linked to a common network and is capable of picking up sound from one or more audio sources.

When the sound of voice from the questioner in the arbitrary position is picked up in the large venue, there are problems in that a system becomes large complicated, and very costly in the configuration in which the plurality of microphones are arranged and switched. In addition, in the configuration in which sound is picked up by moving the microphone to the questioner, a venue staff carries the microphone by hand, for example. Therefore, labor and time are required to move the microphone, and thus, a large amount of labor is required for operation.

An object of the present disclosure is to improve convenience when sound is picked up from a desired sound source in a target area.

SUMMARY OF THE INVENTION

According to the present disclosure, there is provided a microphone array system including: an imaging device that images a picture for a target place; a display that displays image data which is imaged by the imaging device; a microphone array that includes a plurality of microphones, and picks up sound using the microphones; a sound reproducer that reproduces and outputs sound data which is picked up by the microphone array; a sound source analyzer that calculates a sound source position based on the sound data; an image displaying processor that displays the image data which includes the picture for the imaged target place and sound source position display indicative of the sound source position on the display; an instruction inputter that receives an instruction of a specified spot in the image data displayed on the display; a directivity calculator that forms sound directivity in a direction which faces a position corresponding to the specified spot in the specified image data from the microphone array based on the sound data, and that generates or composes sound data acquired by emphasizing sound in a direction having the directivity; and a sound outputter that outputs sound data, acquired after a process relevant to the directivity is performed, to the sound reproducer to reproduce the sound data.

In addition, according to the present disclosure, there is provided a microphone array control method including: imaging a picture for a target place in an imaging device; picking up sound in a microphone array that includes a plurality of microphones; calculating a sound source position based on picked up sound data; displaying the image data which includes the picture for the imaged target place and sound source position display indicative of the sound source position on a display; receiving an instruction of a specified spot in the displayed image data; forming sound directivity in a direction which faces a position corresponding to the specified spot in the specified image data from the microphone array based on the sound data, and generating or composing sound data acquired by emphasizing sound in a direction having the directivity; and outputting sound data, acquired after a process relevant to the directivity is performed, to the sound reproducer to reproduce the sound data.

According to the present disclosure, it is possible to improve convenience when sound is picked up from a desired sound source in a target area.

DETAILED DESCRIPTION OF PREFERRED EMBODIMENTS

Hereinafter, embodiments (hereinafter, referred to as "the embodiment") of a microphone array system and a microphone array control method according to the present disclosure will be described with reference to the accompanying drawings. The microphone array system of the embodiment is applied to, for example, a sound system installed in the facility, such as a venue for lectures, an auditorium, a venue for a general meeting of stockholders or a council, having large interior space, or in a vehicle such as a sightseeing bus, or other places where a plurality of questioners may be present.

Figure 1:
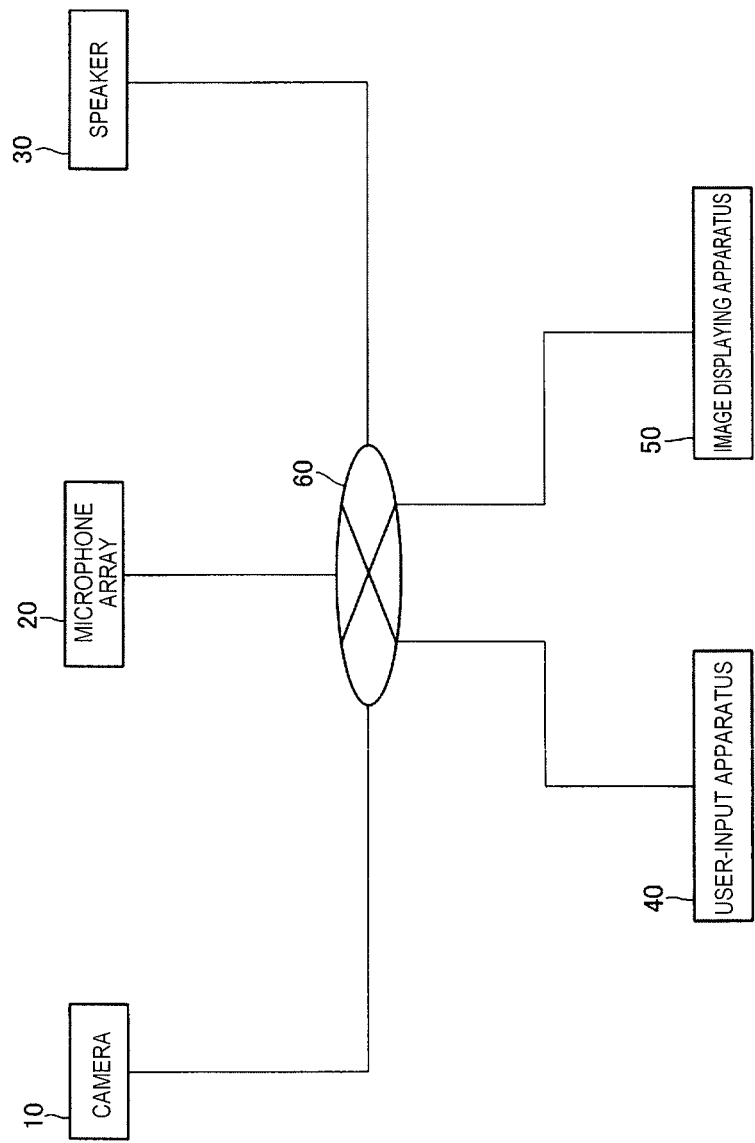
FIG. 1 is a block diagram illustrating the configuration of a microphone array system according to an embodiment.

FIG. 1 is a block diagram illustrating the configuration of a microphone array system according to an embodiment. The microphone array system includes camera 10, microphone array 20, speaker 30, user-input apparatus 40, and image displaying apparatus 50. Camera 10, microphone array 20, speaker 30, user-input apparatus 40, and image displaying apparatus 50 are connected to each other through network 60.

Figure 2:
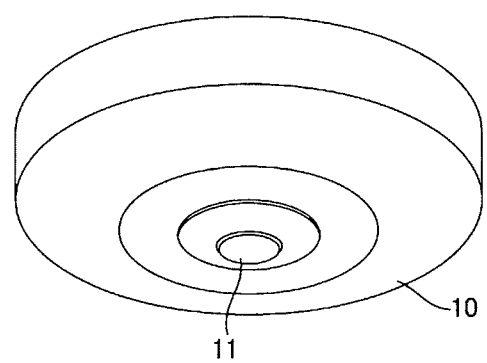
FIG. 2 is a perspective diagram illustrating an example of the exterior configuration of a camera.

Camera 10, as an example of an imaging device, is installed on, for example, an interior ceiling of a hall used for the venue for the lecture, and images the pictures for a target place. FIG. 2 is a perspective diagram illustrating an example of the exterior configuration of camera 10. FIG. 2 illustrates an example of an omnidirectional camera capable of omnidirectionally capturing a 360° radius of the interior space. Camera 10 includes capturing device 11 provided with a capturing lens and a solid-state image sensing device using a Charge Coupled Device (CCD)-type image sensor or a Complementary Metal Oxide Semiconductor (CMOS)-type image sensor therein. Camera 10 outputs the image data of an imaged target, and transmits the image data to image displaying apparatus 50 through network 60.

Figure 3A:
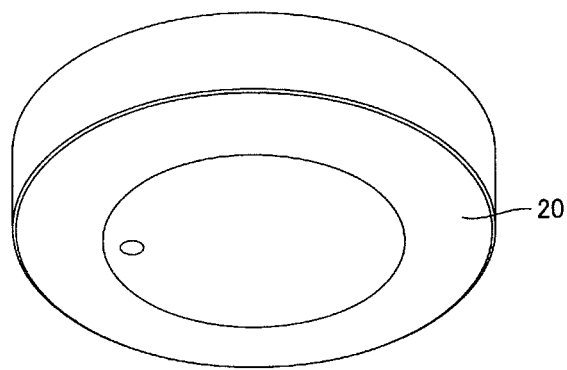
FIG. 3A is a perspective diagram illustrating an example of the exterior configuration of a microphone array.
Figure 3B:
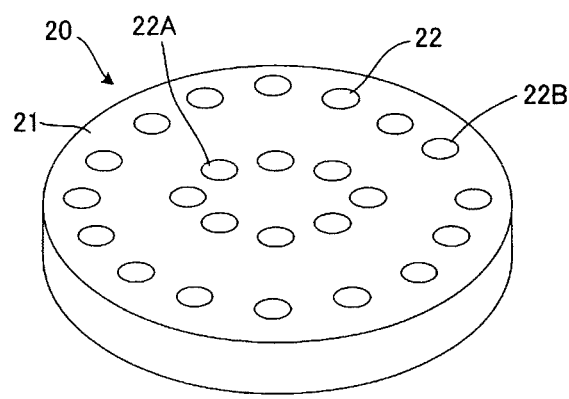
FIG. 3B is a perspective diagram illustrating an example of the configuration of a microphone array.

Microphone array 20, as an example of a microphone array is installed on, for example, an interior ceiling of a hall used for the venue for the lecture, and picks up sound from the target place. FIG. 3A is a perspective diagram illustrating an example of the exterior configuration of a microphone array 20 and FIG. 3B is a perspective diagram illustrating an example of the configuration of microphone array 20.

Microphone array 20 is a group of the microphones in which a plurality of microphones 22 are uniformly arranged in housing 21. FIG. 3B illustrates an example in which the plurality of microphones 22 are provided on one surface of disc-shaped housing 21 and are arranged along two concentric circular shapes, that is, a small circular shape and a large circular shape, having the same center as housing 21. Here, the plurality of microphones 22A, arranged along the small circular shape, have narrow spaces therebetween and have properties suitable for the upper register. In addition, the plurality of microphones 22B, arranged along the large circular shape, have a large diameter and have properties suitable for the lower register. Microphone array 20 picks up sound around a target spot (place) using respective microphones 22, outputs picks up sound data, and transmits the picked up sound data to image displaying apparatus 50 through network 60.

Meanwhile, camera 10 and microphone array 20 are not limited to the separately provided configuration as in the above example, and may include an integral configuration in which camera 10 and microphone array 20 are provided in one housing.

Figure 4:
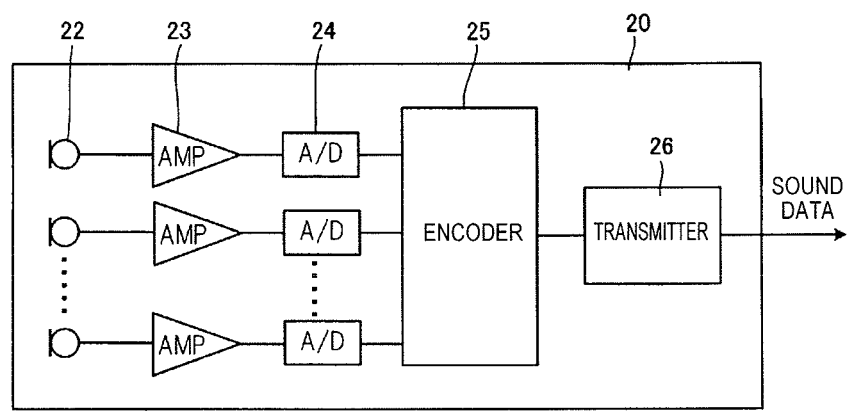
FIG. 4 is a block diagram illustrating the internal configuration of the microphone array.

FIG. 4 is a block diagram illustrating an example of the functional configuration of the signal processor of microphone array 20. Microphone array 20 includes the plurality of microphones 22, a plurality of amplifiers (AMP) 23, a plurality of A/D converters 24, encoder 25, and transmitter 26. Amplifiers 23 and A/D converters 24 are provided for the plurality of microphones 22, respectively. Amplifiers 23 amplify sound signals picked up by microphones 22. A/D converters 24 convert the sound signals output by amplifiers 23 into digital sound data. Encoder 25 encodes the sound data output by the plurality of A/D converters 24, and outputs the encoded sound data as encoded sound data including sound data picked up by the plurality of microphones 22. Transmitter 26 transmits the sound data encoded by encoder 25 to image displaying apparatus 50 through network 60.

Image displaying apparatus 50 includes a function of processing image data imaged by camera 10, a function of displaying the image data, and a function of processing the sound data picked up by microphone array 20.

Figure 5:
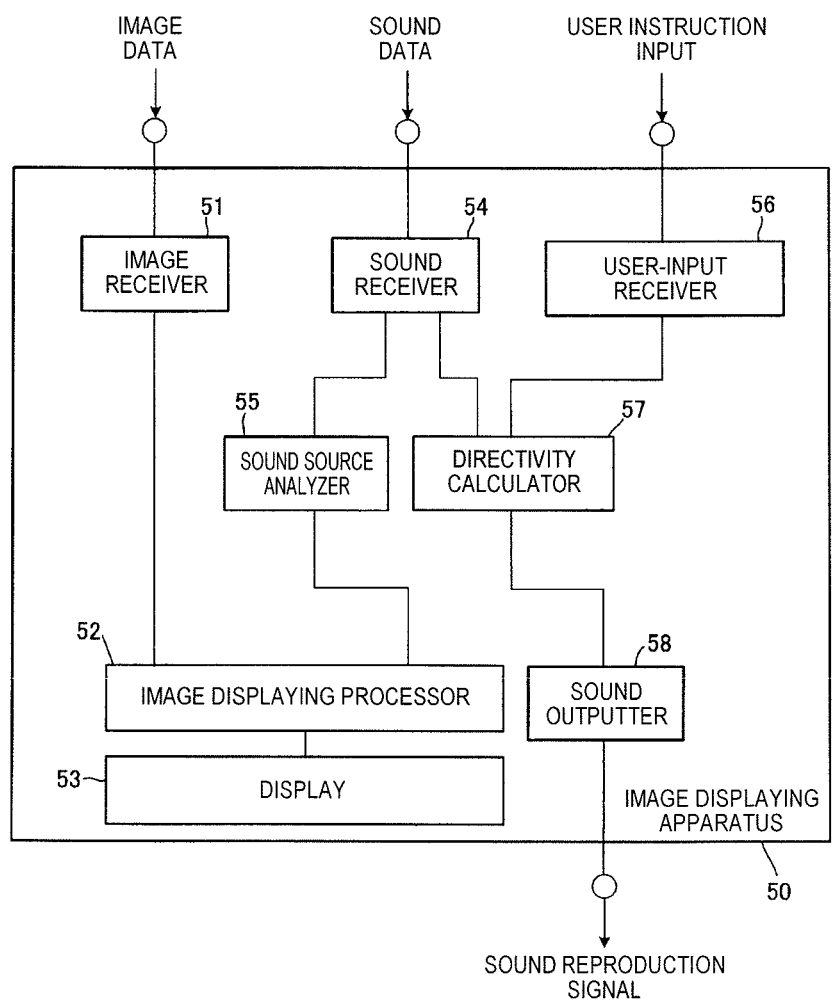
FIG. 5 is a block diagram illustrating the configuration of an image displaying apparatus.

FIG. 5 is a block diagram illustrating an example of the functional configuration of image displaying apparatus 50. Image displaying apparatus 50 includes image receiver 51, image displaying processor 52, display 53, sound receiver 54, sound source analyzer 55, user-input receiver 56, directivity calculator 57, and sound outputter 58. Image receiver 51 and image displaying processor 52 are included as components which realize an image data processing function. Display 53 is included as a component which realizes an image data display function. Sound receiver 54, sound source analyzer 55, directivity calculator 57, and sound outputter 58 are included as components which realize a sound data processing function.

Image receiver 51 receives the image data imaged by camera 10, and outputs the image data to image displaying processor 52. Sound receiver 54 receives the sound data picked up by microphone array 20, and outputs the sound data to sound source analyzer 55 and directivity calculator 57. User-input receiver 56 receives a user instruction input transmitted from user-input apparatus 40, and outputs the user instruction input to directivity calculator 57. Sound source analyzer 55 calculates the position of a sound source by analyzing a direction to which sound arrives based on the sound data picked up by microphone array 20, and outputs sound source position data to image displaying processor 52. At this time, sound source analyzer 55 estimates the direction of the sound source and a distance to the sound source based on a phase difference between a plurality of sound data picked up by respective microphones 22 of microphone array 20, and acquires a sound source position.

Image displaying processor 52 generates a target place picture indicative of the picture for the target place based on the image data and the sound source position data. The target place picture includes sound source position display indicative of the sound source position in the target place. Display 53 as an example of display includes, for example, a displaying apparatus such as a liquid crystal display panel, through which target place picture data output from image displaying processor 52 is input, and the target place picture is displayed. In the embodiment, when the sound source position display is displayed in the target place picture, the sound source position in the picked up sound data is visualized.

Directivity calculator 57 forms a sound directivity for the sound data picked up by microphone array 20 by performing an emphasis process in a specified direction. At this time, in order to emphasize (amplify) sound (volume level) in a direction facing specified spots, to which the user instruction is provided, from the positions of respective microphones 22 of microphone array 20, directivity calculator 57 generates or composes sound data which forms the sound directivity in a direction specified by the user based on the user instruction input. Sound outputter 58 converts the sound data which forms the directivity into an analog sound reproduction signal and outputs the analog sound reproduction signal.

Speaker 30 as an example of a sound reproducer is arranged in the vicinity of image displaying apparatus 50, inputs the sound reproduction signal acquired after performing a process relevant to the directivity output from image displaying apparatus 50, and outputs the sound reproduction signal as sound to a lecturer or an instructor as the user who uses image displaying apparatus 50. Therefore, the user of image displaying apparatus 50 can listen to sound acquired by emphasizing sound in a specified position. Meanwhile, speaker 30 may be arranged at an arbitrary position in a venue, such as a hall, that is, in the target place imaged and sound picked up by camera 10 and microphone array 20 such that people, such as audience members other than the user of image displaying apparatus 50 can listen. In addition, another sound reproduction device, such as a sound processing device that performs various processes relevant to the sound signal or an amplifier that amplifies the sound signal, may be provided as the sound reproducer in addition to the speaker.

User-input apparatus 40 as an example of an instruction inputter includes a touch panel or a touch pad which is arranged to correspond to, for example, the screen of display 53 and which is capable of performing an input operation by the finger of the user or a stylus pen. User-input apparatus 40 outputs coordinate data of one or more specified spots, which desires to emphasize the volume level of the sound data, as a user instruction input to image displaying apparatus 50 according to the operation performed by the user. Meanwhile, user-input apparatus 40 may include a pointing device such as a mouse or a keyboard.

Here, a process relevant to the directivity (hereinafter, referred to as a "directivity process") in the embodiment will be described. In the embodiment, a process of emphasizing sound to a direction of the specified spot, to which the user instruction is provided, is performed by the directivity process using, for example, a delay-and-sum method. Directivity calculator 57 includes delay devices and an adder, and performs addition by respectively giving predetermined delay time to sound data picked up by respective microphones 22. Specifically, directivity calculator 57 arranges phases by giving the delay time corresponding to the difference in arrival time of sound waves in the positions of respective microphones 22 using the delay devices to the respective sound data, and then adds the sound data, acquired after performing the delay process, by the adder. At this time, directivity calculator 57 can generate sound data, in which the volume level of an arbitrary direction is emphasized, by changing the delay time of the respective delay devices.

Figure 6:
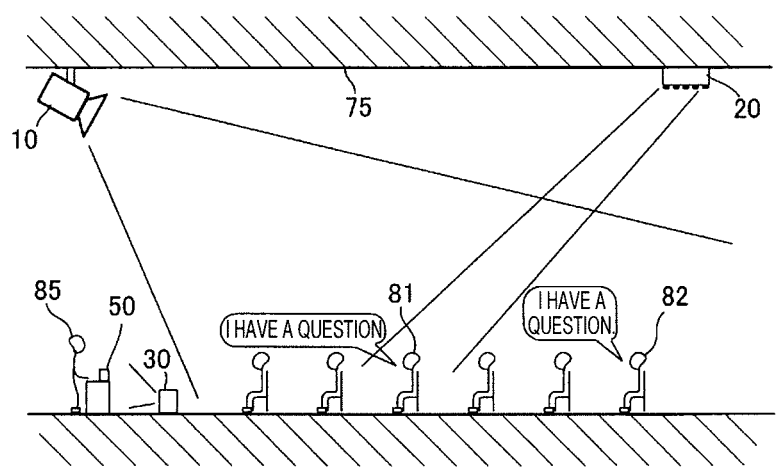
FIG. 6 is a schematic diagram illustrating an example of the form of the use of the microphone array system.

FIG. 6 is a schematic diagram illustrating an example of the form of the use of the microphone array system according to the embodiment. FIG. 6 illustrates an example of a case in which the microphone array system of the embodiment is used in the venue for the lecture. In this case, it is assumed that, for example, a lecturer as the user uses the microphone array system. On ceiling 75 of the interior, such as a hall used for the venue for the lecture, one camera 10 and one microphone array 20 are installed in separate positions. Audience members respectively sit on a plurality of seats arranged in sequence on the floor of the interior, and listen to the lecture performed by lecturer 85. Further, a state is assumed in which two audience members of the plurality of audience members as questioners 81 and 82 ask questions at approximately the same timing.

In this case, when lecturer 85 specifies a desired position in an image using user-input apparatus 40 while watching the target place picture which is imaged by camera 10 and is displayed on image displaying apparatus 50, sound, of which sound in a direction of the specified position is emphasized, is reproduced and output from speaker 30. For example, when lecturer 85 specifies the position of questioner 81, the directivity of microphone array 20 is formed in a direction of questioner 81, and sound data, acquired by emphasizing sound from questioner 81, is generated and reproduced by speaker 30. At this time, directivity calculator 57 of image displaying apparatus 50 generates sound data acquired by emphasizing (amplifying) sound (volume level) in orientation which faces the sound position corresponding to the specified position from the positions of respective microphones 22 using the sound data picked up by respective microphones 22 of microphone array 20. Therefore, lecturer 85 as the user can favorably listen to the question of questioner 81 who is present in a specified position by a simple operation of instructing the desired position in the target place picture.

Figure 7:
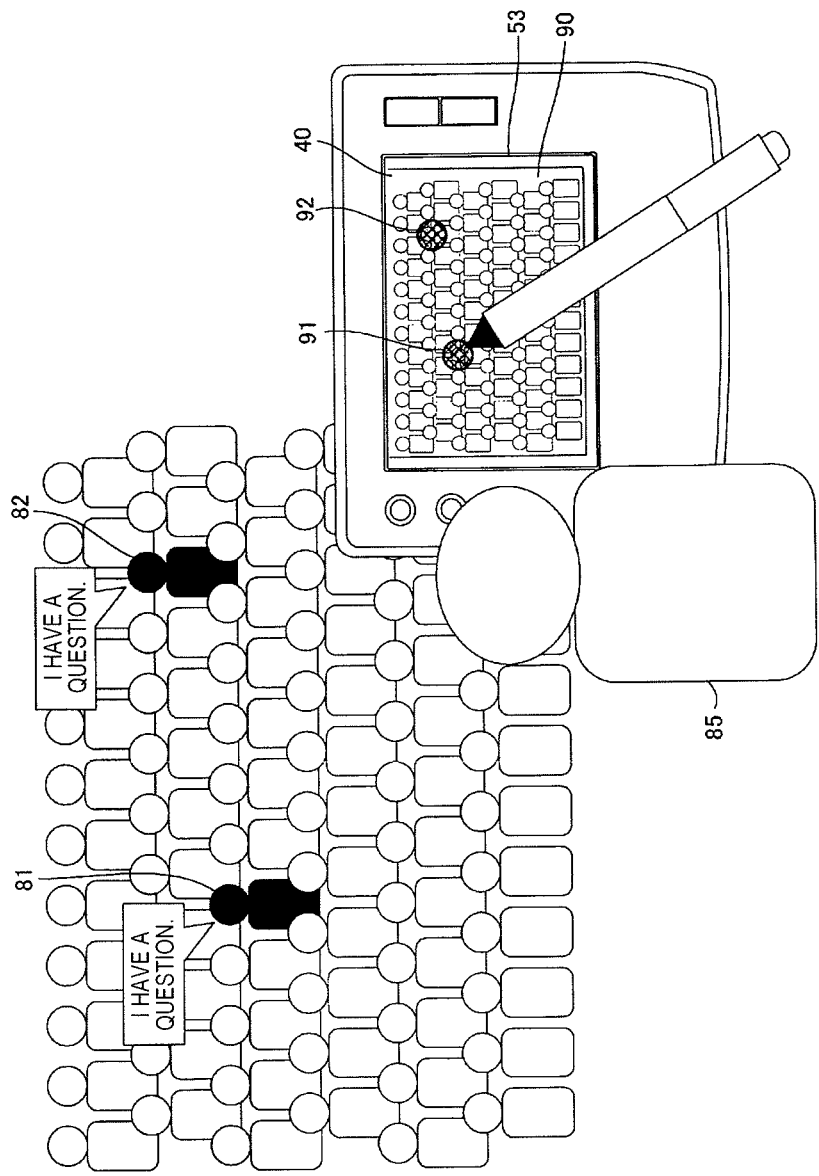
FIG. 7 is a schematic diagram illustrating an example of a state when the microphone array system is used.

FIG. 7 is a schematic diagram illustrating an example of a state when the microphone array system according to the embodiment is used. On display 53 of image displaying apparatus 50, a target place picture 90, acquired by imaging an area where a plurality of audience members are present using camera 10, is displayed. At this time, based on the image data imaged by camera 10, target place picture data is generated by image displaying processor 52 of image displaying apparatus 50, and is output to display 53.

In addition, a sound source position is calculated by sound source analyzer 55 of image displaying apparatus 50 using the sound data picked up by microphone array 20. In image displaying processor 52, the image data of the sound source position display is generated based on the calculated sound source position data. Therefore, display is performed in such a way that sound source position displays 91 and 92 indicative of the sound source positions are superimposed on target place picture 90. Sound source position displays 91 and 92 respectively correspond to the positions of questioners 81 and 82 (that is, sound source positions). Lecturer 85 as the user can easily intuitively recognize the positions of the questioners which are the sound sources through sound source position displays 91 and 92.

A touch panel, as user-input apparatus 40, is arranged on display 53, and an instruction input operation is possible in such a way that lecturer 85, who is the user, specifies a desired position in target place picture 90 using a finger, a stylus pen, or the like. Lecturer 85 watches sound source position displays 91 and 92 of target place picture 90, and specifies the position of the desired questioner. For example, it is assumed that lecturer 85 specifies the position of the sound source position display 91 corresponding to a questioner 81 on the left side of the drawing. In response to the instruction input operation performed by lecturer 85, the coordinate data of the specified spot in target place picture 90 is input to image displaying apparatus 50 as the user instruction input. Further, a directivity process is performed by directivity calculator 57 of image displaying apparatus 50 on the sound data picked up by respective microphones 22 of microphone array 20 in a direction for the specified position (the position of the sound source position display 91), and thus, sound data, acquired by emphasizing sound which arrives from the direction of the specified position, is generated.

Lecturer 85 as the user can clearly distinguish sound from the specified position, that is, the sound from the desired sound source (questioner 81) by listening to the sound which is acquired after the directivity process is performed and reproduced and output from speaker 30. In addition, when speakers 30 are arranged in seats where the audience members are present, other audience members can listen to sound (sound of questioner 81) in a state in which sound from a position specified by lecturer 85 is emphasized.

Figure 8:
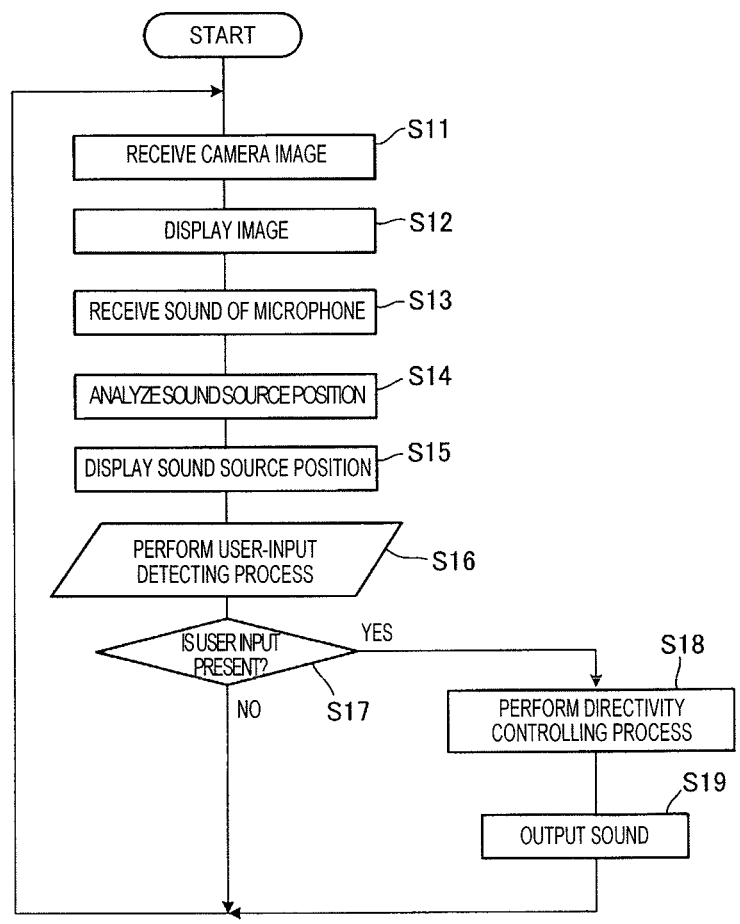
FIG. 8 is a flowchart illustrating a first example of an operational procedure of the microphone array system.

FIG. 8 is a flowchart illustrating a first example of an operational procedure of the microphone array system according to the embodiment. Here, an operation of image displaying apparatus 50 will be mainly described. Image displaying apparatus 50 receives the image data (camera image) imaged by camera 10 using image receiver 51 (step S11). Further, image displaying apparatus 50 processes the image data using image displaying processor 52, and displays target place picture 90 on display 53 (step S12).

In addition, image displaying apparatus 50 receives the sound data (microphone sound) picked up by microphone array 20 using sound receiver 54 (step S13). Further, image displaying apparatus 50 analyzes the sound source position based on the sound data using sound source analyzer 55, and calculates the sound source position data (step S14). Subsequently, image displaying apparatus 50 generates the image data indicative of the sound source position based on the sound source position data using image displaying processor 52, and displays sound source position displays 91 and 92 in target place picture 90 (step S15). Meanwhile, when the sound source position is displayed, an image acquired by enlarging (zooming) the vicinity of sound source position displays 91 and 92 may be displayed as target place picture 90.

Subsequently, image displaying apparatus 50 monitors the reception of the user instruction input in the user-input receiver 56, and detects the user input (step S16). In the user-input detecting process, it is determined whether or not the user input is present according to the reception of the user instruction input (step S17). When it is determined that the user input is present in step S17, image displaying apparatus 50 performs the directivity process using directivity calculator 57, forms the directivity in a direction of the specified position corresponding to the user instruction input, and generates the sound data on which an emphasis process is performed in the specified direction (step S18). Further, image displaying apparatus 50 outputs the sound data, acquired after the directivity process is performed, using sound outputter 58, and outputs the sound reproduction signal, acquired by emphasizing sound from the specified spot, using speaker 30 (step S19).

As above, in the embodiment, it is possible to visualize the sound source position of sound picked up by microphone array 20 in the target place picture imaged by camera 10. In addition, with reference to the visualized sound source position display, it is possible to specify a sound source position to which the user desires to listen and to reproduce the sound data in which directivity is formed in the specified direction.

Figure 9:
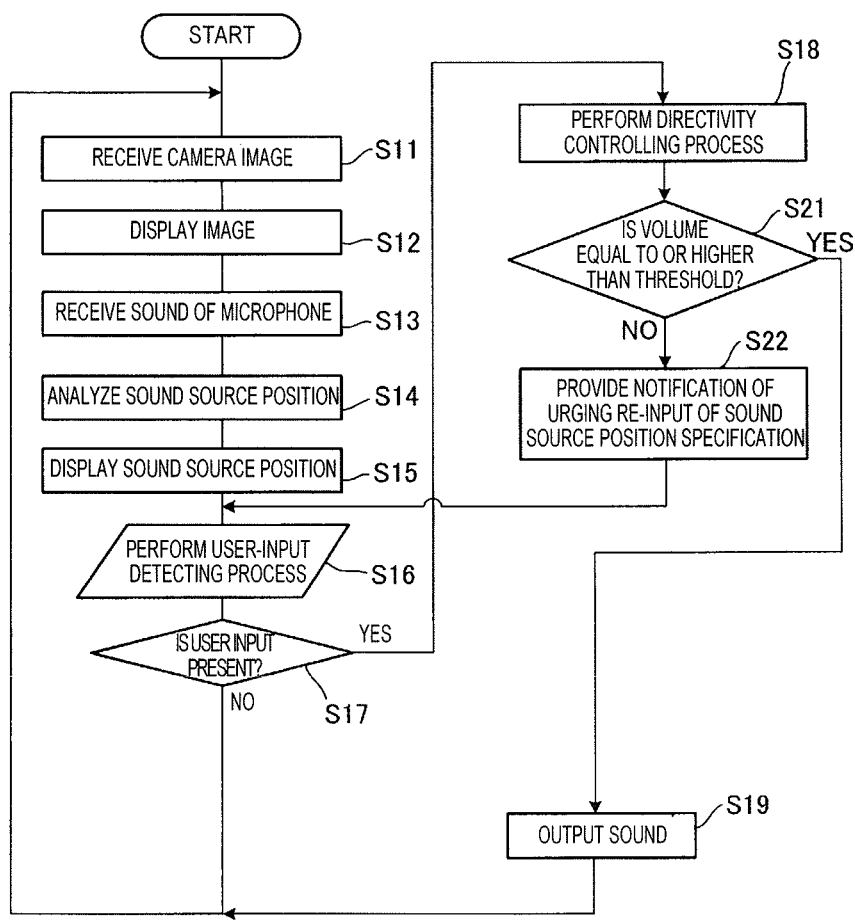
FIG. 9 is a flowchart illustrating a second example of the operational procedure of the microphone array system.

FIG. 9 is a flowchart illustrating a second example of the operational procedure of the microphone array system according to the embodiment. The second example shows an operation performed when a spot specified by the user is deviated from an actual sound source position.

The operations in steps S11 to S17 are the same as in the above-described first example, target place picture 90 is displayed based on the image data imaged by camera 10, the sound source is analyzed based on the sound data picked up by microphone array 20, and sound source position displays 91 and 92 are displayed.

When it is determined that the user input is present in step S17, image displaying apparatus 50 performs the directivity process using directivity calculator 57, forms directivity to the direction of the specified position corresponding to the user instruction input, and generates the sound data on which the emphasis process is performed in the specified direction (step S18). Subsequently, image displaying apparatus 50 refers to the volume level of the sound data acquired after the directivity process is performed by directivity calculator 57, and determines whether or not the volume in the specified direction is equal to or larger than a predetermined threshold (step S21).

When the volume in the specified direction is smaller than the threshold in step S21, image displaying apparatus 50 provides a notification of urging re-input of sound source position specification (step S22). With regard to the notification, for example, image displaying processor 52 generates the image data of a message for display, and displays the message of urging the re-input on target place picture 90. Meanwhile, the embodiment is not limited to the display of the message, and it is possible to use other various notification means such as sound notifications. Further, returning to steps S16 and S17, the user-input detecting process and the user-input determining process are performed.

When the volume in the specified direction is equal to or larger than the threshold in step S21, image displaying apparatus 50 outputs the sound data acquired after the directivity process is performed using sound outputter 58, and outputs the sound reproduction signal, acquired by emphasizing the sound from the specified position, using speaker 30 (step S19).

In the second example, when the volume level of the sound data in which the directivity is formed in the specified direction is small, it is possible to perform the sound source position specification again and to favorably reproduce the sound data in which the directivity is formed in the specified direction. Meanwhile, instead of the user inputting the specified position again, it is possible to give a function of adjusting the directivity in the direction, in which the volume level of the sound data becomes high by gradually moving the specified position such that a volume level is acquired which is equal to or higher than a predetermined value as the sound data acquired after the directivity process is performed.

In the related art, when sound from a questioner in an arbitrary position is picked up in the venue such as a lecture meeting, sound is picked up by moving a microphone to the questioner. Therefore, labor and time are required to move the microphone, and thus, there is a problem in that a large amount of labor is required for operation. In addition, a problem occurs in the microphone becoming damaged or the microphone becoming destroyed when the microphone is moved. In contrast, in the embodiment, the sound source position is visualized and displayed in the imaged target place picture, and the user, such as a lecturer, recognizes the sound source position display and specifies the position of the desired questioner. Therefore, it is possible to reproduce sound acquired by emphasizing sound from the desired specified position in the picked up sound data. Accordingly, it is possible to simply pick up and reproduce sound from a desired questioner in the target area, and thus, it is possible to improve the convenience of the user.

Next, another application example of the embodiment will be described. It is possible to install the microphone array system according to the embodiment in a vehicle such as a sightseeing bus. In this case, is assumed that, for example, a bus guide is the user of the microphone array system. In the example, the inside of the vehicle is imaged by a camera arranged on a ceiling or the like, and a target place picture is displayed on a display arranged in the vicinity of the bus guide who is the user. In addition, sound of the inside of the vehicle is picked up by the microphone array arranged on a ceiling or the like, the sound source position is calculated based on the picked up sound data, and the sound source position display is displayed in the target place picture of the display.

Here, when the bus guide who is the user specifies the desired position, according to the user instruction input indicative of the specified spot, the directivity is formed in a direction which faces the position of the specified spot (sound source position or the like), and the sound data acquired by emphasizing sound in the orientation is generated. Further, the sound data, acquired after the directivity process is performed, is output to the speaker arranged on the inside of the vehicle, and the picked up sound in which the directivity is given in the direction of the specified spot is reproduced. Therefore, when the bus guide who is the user performs a simple operation of instructing a desired position in the target place picture, it is possible to clearly reproduce and listen to sound emitted by a passenger in a specified position. In addition, when speakers are arranged in a plurality of spots in an arbitrary position of the inside of the vehicle, the bus guide and the passenger in the vehicle can listen to sound from a specified position in a state in which the sound is emphasized.

In the related art, when sound is picked up and reproduced in the sightseeing bus, sound is picked up by moving a microphone to the questioner. Therefore, there is a problem in that labor and time are required to move the microphone, which causes inconvenience. In addition, a problem occurs in that the microphone is damaged due to the falling when the microphone is moved. In contrast, in the embodiment, the sound source position in the imaged target place picture is visualized and displayed, and the user, such as the bus guide, specifies the position of the desired questioner after recognizing the sound source position display. Therefore, it is possible to reproduce sound, in which sound from the desired specified position is emphasized, in the picked up sound data inside the vehicle. Accordingly, it is possible to simply pick up and reproduce sound from a desired questioner in the target area, and thus, it is possible to improve the convenience of the user.

Meanwhile, when the sound source position display is displayed in the target place picture which is displayed on the display, the embodiment is not limited to the sound source position display which indicates the sound source position. As another example of the sound source position display, silent area display may be generated which indicates a low volume area, in which the volume level is equal to or lower than a predetermined value, for the sound source position, and may be displayed in the target place picture. In addition to the sound source position, a position where nobody makes a question in contradiction to the sound source position, a silent position, or the like can be displayed as a remarkable position in the target place and can be recognized by the user. In this case, for example, it is possible to eliminate an area which includes the sound source position and has the volume level that is equal to or higher than a predetermined value, and calculate the silent area. In addition, it is possible to calculate the silent area based on the statistics of the volume levels on the time axis. According to the example, it is possible to visualize an area where the volume level is low and to cause the user to easily recognize the area.

As above, the microphone array system according to the embodiment includes camera 10 that images a picture for the target place; display 53 that displays image data imaged by camera 10; microphone array 20 that includes the plurality of microphones 22 and picks up sound using the microphone 22; speaker 30 that reproduces and outputs sound data picked up by microphone array 20; sound source analyzer 55 that calculates a sound source position based on the sound data; image displaying processor 52 that displays image data, which includes imaged target place picture 90 and sound source position displays 91 and 92 indicative of the sound source positions, on display 53; user-input apparatus 40 that receives an instruction of a specified spot in the image data displayed on display 53; directivity calculator 57 that forms sound directivity in a direction which faces a position corresponding to the specified spot from microphone array 20 based on the sound data, and that generates or composes the sound data acquired by emphasizing sound in a direction having the directivity; and sound outputter 58 that outputs the sound data, acquired after the directivity process is performed, to speaker 30 to reproduce the sound data.

As above, the sound source position display indicative of the sound source position is displayed together with the imaged target place picture, and thus, it is possible to visualize the sound source position and to cause the user to easily recognize the sound source position. In addition, the sound directivity is formed according to the instruction input of the specified spot and sound data acquired by emphasizing sound in the direction having directivity is generated or composed, and thus, the user can specify the desired sound source position and can reproduce the sound data in which directivity is formed in the specified direction. Therefore, it is possible to simply pick up and reproduce sound from the sound source of the desired position in the target area, and thus, it is possible to improve the convenience of the user.

In addition, in the microphone array system according to the embodiment, when there are a plurality of sound source positions calculated by sound source analyzer 55, image displaying processor 52 generates sound source position displays 91 and 92 corresponding to the plurality of respective sound source positions, and displays sound source position displays 91 and 92 on display 53.

Therefore, the user can easily recognize the respective sound source positions of the plurality of sound sources through the sound source position displays.

In addition, in the microphone array system according to the embodiment, when an instruction of a specified spot corresponding to one of the plurality of sound source positions is received by user-input apparatus 40, directivity calculator 57 generates or composes the sound data acquired by emphasizing sound in a direction which faces the sound source position of the specified spot.

Therefore, it is possible to form directivity in a direction corresponding to the specified spot specified by the user and to clearly reproduce sound from the specified sound source position.

In addition, in the microphone array system according to the embodiment, image displaying processor 52 generates the silent area display indicative of an area in which the volume level is low, that is, equal to or smaller than the predetermined value for the sound source position as the sound source position display, and displays the silent area display on display 53.

Therefore, it is possible to visualize the area in which the volume level is low in the target place, and it is possible to cause the user to easily recognize the area.

In addition, a microphone array control method according to the embodiment includes imaging a picture for a target place in camera 10; picking up sound in microphone array 20 that includes a plurality of microphones 22; calculating a sound source position based on picked up sound data;

displaying the image data, which includes imaged target place picture 90 and sound source position displays 91 and 92 indicative of the sound source position, on display 53; receiving an instruction of a specified spot in the displayed image data; forming sound directivity in a direction which faces a position corresponding to the specified spot from microphone array 20 based on the sound data, and generating or composing sound data acquired by emphasizing sound in a direction having the directivity; and outputting sound data, acquired after the directivity process is performed, to speaker 30, to reproduce the sound data.

As above, various embodiments are described with reference to the accompanying drawings. However, it is apparent that the invention is not limited to the examples. It is apparent that those skilled in the art can easily understand various changed examples and modification examples in a category disclosed in the claims, and understand that the changed examples and the modification examples rightly belong to the claims of the present disclosure. In addition, the respective components in the embodiment may be arbitrarily composed without departing from the gist of the invention.

The present disclosure is useful as a microphone array system and a microphone array control method which are capable of improving convenience when sound from a desired sound source in a target area is picked up.

What is claimed is:

1. A microphone array system comprising:
an imaging device that images a picture for a target place;
a display that displays image data which is imaged by the imaging device;
a microphone array that includes a plurality of microphones, and picks up sound using the plurality of microphones;
a sound reproducer that reproduces and outputs the sound which is picked up by the microphone array; and
a processor that performs operations comprising:
calculating a sound source position based on the sound picked up by the microphone array;
displaying, on a display, an image, which includes the picture for the target place and a sound source position mark indicative of the sound source position;
receiving an instruction of a specified spot in the image displayed on the display;
forming sound directivity in a direction from the microphone array toward a position corresponding to the specified spot in the image displayed on the display based on the sound picked up by the microphone array, and generating or composing sound data by emphasizing sound in the direction in which the sound directivity formed; and
outputting the sound data, which is generated or composed after the sound directivity is formed, to cause the sound reproducer to reproduce the sound data,
wherein, the displaying of the image comprises generating a silent area mark, which indicates an area having a volume level equal to or lower than a predetermined value for the sound source position, and displaying the generated silent area mark on the display.

2. The microphone array system according to claim 1,
wherein, when a plurality of sound source positions are calculated, the sound source position marks corresponding to the plurality of respective sound source positions are generated and displayed on the display.

3. The microphone array system according to claim 2,
wherein, when the instruction of the specified spot corresponding to one of the plurality of sound source positions is received, the sound data is generated and composed by emphasizing the sound in the direction from the microphone array toward the sound source position of the specified spot.

4. A microphone array control method comprising:
imaging a picture for a target place by an imaging device;
picking up sound, by a microphone array that includes a plurality of microphones;
calculating a sound source position based on the picked up sound;
displaying, on a display, an image, which includes the picture of the target place and a sound source position mark indicative of the sound source position;
receiving an instruction of a specified spot in the image displayed on the display;
forming sound directivity in a direction from the microphone array toward a position corresponding to the specified spot in the image displayed on the display, based on the sound picked up by the microphone array, and generating or composing sound data by emphasizing sound in the direction in which the sound directivity is formed; and
outputting the sound data, which is generated or composed after the sound directivity is formed,
wherein, the displaying of the image comprises generating a silent area mark, which indicates an area having a volume level equal to or lower than a predetermined value for the sound source position, and displaying the generated silent area mark on the display.

5. The microphone array control method according to claim 4,
wherein, when a plurality of sound source positions are calculated, sound source position marks corresponding to the plurality of respective sound source positions are generated and displayed on the display.

6. The microphone array control method according to claim 5,
wherein, when the instruction of the specified spot corresponding to one of the plurality of sound source positions is received, the sound data is generated and composed by emphasizing the sound in the direction from the microphone array toward the sound source position of the specified spot.

7. The microphone array system according to claim 1, wherein the imaging device comprises a camera, and the sound reproducer comprises a speaker.

* * * * *